United States Patent Office 3,709,847
Patented Jan. 9, 1973

3,709,847
PREPARATIONS OF REACTION PRODUCTS OF EPOXIDES, FATTY AMINES AND BASIC POLYAMIDES, PROCESSES FOR THEIR MANUFACTURE AND THEIR USE
Rosemarie Toepfl, Basel, Heinz Abel, Reinach, and Arthur Maeder, Therwil, Switzerland, assignors to Ciba-Geigy AG, Basel, Switzerland
No Drawing. Filed Jan. 29, 1971, Ser. No. 111,088
Claims priority, application Switzerland, Feb. 6, 1970, 1,174/70
Int. Cl. C08g 41/04
U.S. Cl. 260—18 PN    17 Claims

ABSTRACT OF THE DISCLOSURE

A process for the manufacture of stable preparations of water-soluble or water-dispersible reaction products of epoxides, fatty amines and basic polyamides is provided. The epoxides contain at least two epoxide groups per molecule, the amines are higher-molecular weight fatty amines [$H_3C-(CH_2)_x-NH_2$ wherein $x$ represents an integer having the value of 11 to 23] and the polyamides are made from polymeric unsaturated fatty acids and polyalkylenepolyamines. The reaction is carried out in the presence of an organic solvent at temperatures up to 95° C. Not later than after completion of the reaction, it is ensured that a sample of the reaction mixture has a pH-value of 2 to 8 after dilution with water. The resulting reaction products are soluble in water and are useful in the textile industry e.g. for rendering wool non-felting.

---

The subject of the invention is a process for the manufacture of stable preparations of water-soluble or water-dispersible reaction products of epoxides, fatty amines and basic polyamides, characterised in that (a) a reaction product of at least (a') one epoxide which contains at least two epoxide groups per molecule, and at least (a'') one higher-molecular fatty amine, the equivalent ratio of epoxide groups to amino groups being 1:0.1 to 1:0.85, is reacted with (b) a basic polyamide which is obtained by condensation of (b') polymeric, unsautrated fatty acids and (b'') polyalkylenepolyamines, in the presence of an organic solvent, at temperatures up to 95° C., with the equivalent ratio of epoxide groups of the component (a) to amino groups of the component (b) being 1:1 to 1:6, preferably 1:1 to 1:5, and that provision is made, by addition of acid not later than on completion of the reaction, that a sample of the reaction mixture has a pH value of 2 to 8 after addition of water.

By an equivalent, there is to be understood the amount of basic polyamide in grams which is equivalent to one mol of monoamine.

The epoxides (a') from which the component (a) is obtained are preferably derived from polyhydric phenols or polyphenols, such as resorcinol, and phenol-formaldehyde condensation products of the type of the resols or novolaks. Bisphenols such as bis-(4-hydroxy-phenyl)-methane and above all 2,2-bis-(4'-hydroxyphenyl)-propane are especially preferred as starting compounds for the manufacture of the epoxides.

Especial mention may here be made of epoxides of 2,2-bis-(4'-hydroxyphenyl)-propane which have an epoxide content of 1.8 to 5.8 epoxy group equivalent/kg., but preferably at least 5 epoxy group equivalents/kg., and which correspond to the formula (1) 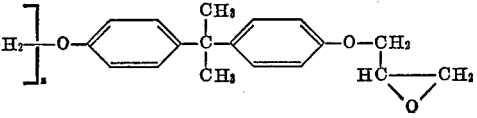

wherein $z$ denotes an average number having a value of 0 to 0.65. Such epoxides are obtained by reaction of epichlorohydrin with 2,2-bis-(4'-hydroxyphenyl)-propane.

Components (a'') which have proved very suitable are above all mono-fatty amines with 12 to 24 carbon atoms. As a rule, these are amines of the formula (2) 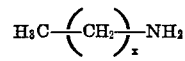

wherein $x$ represents an integer having the value of 11 to 23, preferably 17 to 21. The amines are thus, for example, laurylamine, palmitylamine, stearylamine, aralchidylamine or behenylamine. Mixtures of such amines, such as are obtainable as technical products, can also be used.

The reaction of the component (a') with the component (a'') appropriately takes place at 80 to 120° C., preferably 100° C.

According to the invention, the ratio of epoxides (a') to amine (a'') in the component (a) is so chosen that an excess of epoxide is used, so that there is more than one epoxide group for each amino group. The reaction products (a) contain epoxide end groups. According to the invention, the amount of the components (a') and (a'') should be so chosen that an equivalent ratio of 1 epoxide group to 0.1 to 0.5 amino group is present, that is to say the amount of epoxide which corresponds to one epoxide group equivalent is reacted with the amount of amine which corresponds to an amino group equivalent of 0.1 to 0.5. Preferably, the equivalent ratio of epoxide groups to amino groups is 1:0.1 to 1:0.5 or especially 1:0.25 to 1:0.5.

The polymeric unsaturated fatty acids used as the component (b') for the manufacture of the basic polyamides (b) are preferably aliphatic, ethylenically unsaturated dimeric to trimeric fatty acids. Preferably, the reaction products (b) are here manufactured from the polyalkylenepolyamines (b'') and aliphatic unsaturated dimeric to trimeric fatty acids (b') which are derived from monocarboxylic acids with 16 to 22 carbon atoms. These monocarboxylic acids are fatty acids with at least one, and preferably 2 to 5, ethylenically unsaturated bonds. Representatives of this class of acids are, for example, oleic acid, hiragonic acid, elaeostearic acid, licanic acid, arachidonic acid, clupanodonic acid and especially linoleic acid and linolenic acid. These fatty acids can be obtained from natural oils, wherein they occur above all as glycerides.

The dimeric to trimeric fatty acids (b') used according to the invention are obtained ina known manner by dimerisation of monocarboxylic acids of the nature indicated. The so-called dimeric fatty acids always contain some trimeric acids and a small amount of monomeric acids.

The dimerised to trimerised linoleic or linolenic acids are particularly suitable for use as component (b'). The technical products of these acids as a rule contain 75 to 95 percent by weight of dimeric acid, 4 to 25 percent by weight of trimeric acid and a trace to 3% of monomeric acid. The molar ratio of dimeric acid to trimeric acid is accordingly about 5:1 to 36:1.

Suitable components (b'') are above all polyamines, such as diethylenetriamine, triethylenetetramine or tetraethylenepentamine, that is to say amines of the formula (3) $H_2N-(CH_2-CH_2-NH)_n-CH_2-CH_2-NH_2$ wherein $n$ is equal to 1, 2 or 3.

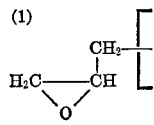

In the case of amine mixtures, it is also possible to assume a non-integral average value, for example between 1 and 2.

As a component of especial interest, a basic polyamide of dimerised to trimerised linoleic or linolenic acid and a polyamine of the Formula 3 is used.

Possible organic solvents, in the presence of which the reaction of the component (a) with (b) takes place, are above all water-soluble organic solvents, and in particular appropriately those which are miscible with water to an unlimited extent. As examples there may be mentioned dioxane, isopropanol, ethanol and methanol, ethylene glycol n-butyl ether (=n-butylglycol), and diethylene glycol monobutyl ether.

At the same time, however, it is also possible to carry out the reaction in the presence of water-insoluble organic solvents, for example in petrol hydrocarbons such as petrol or petroleum ether, benzene, or benzenes which are halogenated or substituted by lower alkyl groups, such as toluene, xylene or chlorobenzenes; alicyclic compounds such as tetralin or cyclohexane; and halogenated hydrocarbons such as methylene chloride, methylene bromide, chloroform, carbon tetrachloride, ethylene chloride, ethylene bromide, s-tetrachloroethane and above all trichloroethylene or perchloroethylene.

The reaction products thus obtained are soluble, or at least dispersible, in water.

The reaction products of (a) epoxide-fatty amine and (b) polyamide can optionally also be obtained with the conjoint use of a third component (c), namely a further monofunctional or difunctional compound, which is different from (a) and (b). These monofunctional or difunctional compounds possess mobile halogen atoms, or vinyl, acid, ester, acid anhydride, isocyanate or epoxide groups as functional groups or atoms. Appropriately, about 0.25 mol of the monofunctional compound (c) are used per one amino group equivalent of the component (b) but this content can also be increased up to, for example, 0.5 mol per amino group equivalent. Of the difunctional compounds, preferably 0.05 to 0.5 mol are employed per one amino group equivalent of the component (b).

These components (c) are preferably aralkyl or alkyl halides, nitriles or amides of acids of the acrylic acid series, aliphatic or aromatic carboxylic acids, their esters or anhydrides, and aliphatic or aromatic isocyanates, epoxides or epihalogenohydrins.

The following are advantageously used as monofunctional component (c): alkyl halides such as ethyl bromide or butyl chloride, aralkyl halides such as benzyl chloride; nitriles or amides of acrylic acid or methacrylic acid such as acrylonitrile or acrylic acid amide; alkanecarboxylic acids with up to 18 carbon atoms such as coconut fatty acid or stearic acid, or their esters with alkanols which contain at most 5 carbon atoms, for example methanol, ethanol or n-butanol, or their anhydrides such as acetic anhydride; aromatic isocyanates such as phenyl isocyanate, or aliphatic or aromatic epoxides such as propylene oxide, butylene oxide, dodecene oxide or styrene oxide. The preferred difunctional component (c) is epichlorohydrin.

Particularly suitable components (c) are alkylene oxides with at most 12 carbon atoms, alkanecarboxylic acids with at most 18 carbon atoms, monocyclic aralkyl halides or acrylonitrile.

The sequence in which the reaction of the polyamides with the monofunctional compounds and epoxide-fatty amine reaction products takes place is of subordinate importance. It is possible first to carry out a reaction with a monofunctional compound and then with the epoxide-fatty amine reaction product, or vice versa. In some cases, if there are no great differences in the reactivity, the reaction can also be carried out simultaneously.

The reaction to give the reaction product of the components (a) and (b) is now carried out in such a way that polyaddition products which are soluble or dispersible in water are produced, by adjusting the pH value, not later than after completion of the reaction, to 2 to 8, preferably to 2 to 7, but especially to 5 to 6. Inorganic or organic acids are, for example, used to adjust this pH value, easily volatile organic acids such as formic acid or acetic acid being advantageous. It is advisable to add a certain amount of acid to the reaction mixture immediately on, or shortly after, commencing to combine the polyamide with the epoxide, and also to add further acid continuously or in portions during the further reaction. Furthermore, the process is preferably carried out at temperatures of up to 80° C., that is to say for example of 25 to 80° C., especially 45 to 70° C. The resulting solutions or dispersions—they are in most cases slightly opalescent to cloudy solutions—which have been adjusted with acid to the desired pH value and appropriately adjusted to a content of 10 to 30% of the reaction product by means of an organic solvent or preferably by means of water, are distinguished by high stability.

Products with advantageous properties are also obtained if, after the addition of the acid and of the water, the preparation is further stored at room temperature or elevated temperature, for example for 4 hours at 70° C. or for longer period at a lower temperature.

The preparations of the nature indicated initially are suitable for finishing textiles, especially for rendering wool non-felting, in which case one possibility is to impregnate the wool with an aqueous liquor to which the preparation and, if desired, yet further additives such as wetting agents, dispersing agents and/or acids have been added, then to dry it and to subject it to a treatment at elevated temperature. However, it proves particularly advantageous to use the process for dyeing wool and rendering it non-felting, in which, successively and in optional sequence, using the exhaustion method, the wool is on the one hand dyed and on the other hand treated, at temperatures of 35 to 100° C. and a pH value of 7 to 3, with the preparations of epoxides and basic polyamides. Dyeing and rendering non-felting can thereby be combined in a simple manner and carried out in the same apparatus without the wool being taken out of the apparatus between the two processes. Rendering the wool non-felting can also be carried out in accordance with a padding process.

Dyeing can in these cases be carried out in the customary manner which is in itself known, using any desired dyestuffs which can be used for wool, for example acid wool dyestuffs, 1:1 or 1:2 metal complex dyestuffs or reactive dyestuffs. Equally, it is possible to use the additives which are customary when dyeing wool, such as sulphuric acid, acetic acid, sodium sulphate, ammonium sulphate and levelling agents, possible levelling agents being above all polyglycol compounds of higher aliphatic amines, which can optionally also be quaternised and/or esterified at the hydroxyl groups by polybasic acids.

The liquor used for rendering the wool non-felting contains, in addition to the preparation of the polyaddition product, also the amount of base, for example ammonia, disodium phosphate or trisodium phosphate, required to set up the alkaline medium. The amount of polyaddition product (not counting solvents and water), relative to the weight of the wool, is appropriately 0.5 to 5%. As has been mentioned, the process is carried out at temperatures of 35 to 100° C., and in doing so, between 20 and 80 minutes is in most cases required for extensive to practically complete fixing of the polyaddition product.

The sequence of the two processes is optional but in general it tends to be advantageous to carry out the dyeing first and the non-felting treatment afterwards.

The combined process for dyeing wood and rendering it non-felting is particularly suitable for use in actual machine dyeing, where the goods being dyed are static and the liquor is agitated.

Advantageous non-felting effects are furthermore achieved by adding oxidising agents, such as hydrogen peroxide, to the treatment baths. If desired, the permanence of the non-felting finishers can be improved by pre-treating the wool with a dilute aqueous solution of dichloroisocyanurate acid or its alkali metal salt before the wool is treated with the preparation which contains a reaction product.

If treatment baths with a high content of organic, above all water-insoluble, solvents, or even anhydrous baths containing only organic solvents, are used, the process is appropriately carried out in closed apparatuses, for example of the type used in dry cleaning.

Further, the preparations can be used as sizing agents for paper.

When using the preparations in combination with an aminoplast pre-condensate on textiles, especially cotton, a wash-resistant "soil release" effect is achieved. Using the preparations, it is also possible to provide textiles with a so-called non-iron finish.

Furthermore, dyestuffs, especially reactive dyestuffs, are well fixed to textiles, especially wool, with the aid of preparations which contain the present reaction products, and this is expressed in an improved fastness to perspiration.

Further, finishes using the present reaction products also improve the mechanical properties, for example tear strength, elongation at break, abrasion resistance, and tendency to pilling, of the treated textile material. Furthermore, it is sometimes also possible to use the reaction products in an organic solvent, that is to say either as a solution or as a dispersion in an organic solvent. Possible solvents are here the same as those described for the manufacturing process.

Where the reaction products are insoluble in water-insoluble organic solvents, they can be dispersed in the water-insoluble solvent in the presence of an organo-soluble surface-active agent. For this purpose the reaction product, the solvent and the surface-active agent can be mixed with stirring, or alternatively, and advantageously, the reaction product can be worked into a paste with the surface-active agent and then introduced into the solvent, with stirring. A stable dispersion is produced.

This dispersion is applied in the same way as described for the aqueous preparations.

In the manufacturing instructions and examples which follow, the percentages are percentages by weight.

MANUFACTURING INSTRUCTIONS (A) 196 g. (1 epoxide group equivalent) of an epoxide formed from 2,2-bis-(4'-hydroxyphenyl)-propane and epichlorohydrin, together with 31 g. (0.1 amino group equivalent) of a mixture of 1-amino-eicosane and 1-amino-docosane, are stirred for one hour at 100° C. A clear, viscous product with an epoxide group equivalent weight of 255 is obtained.

(B) 196 g. (1 epoxide group equivalent) of the epoxide described under (A), together with 62 g. (0.2 amino group equivalent) of the fatty amine described under (A), are stirred for one hour at 100° C. A clear, viscous product with an epoxide group equivalent weight of 313 is obtained.

(C) 196 g. (1 epoxide group equivalent) of the epoxide described under (A), together with 77.5 g. (0.25 amino group equivalent) of the fatty amine described under (A), are stirred for one hour at 100° C. A highly viscous product with an epoxide group equivalent weight of 379 is obtained.

(D) 196 g. (1 epoxide group equivalent) of the epoxide described under (A), together with 93 g. (0.3 amino group equivalent) of the fatty amine described under A), are stirred for one hour at 100° C. A highly viscous product with an epoxide group equivalent weight of 436 is obtained.

(E) 196 g. (1 epoxide group equivalent) of the epoxide described under (A), together with 108.5 g. (0.35 amino group equivalent) of the fatty amine described under (A), are stirred for one hour at 100° C. A highly viscous product with an epoxide group equivalent weight of 498 is obtained.

(F) 196 g. (1 epoxide group equivalent) of the epoxide described under (A) together with 124 g. (0.04 amino group equivalent) of the fatty amine described under (A), are stirred for one hour at 100° C. A highly viscous product with an epoxide group equivalent weight of 507 is obtained.

(G) 196 g. (1 epoxide group equivalent) of the epoxide described under (A), together with 155 g. (0.5 amino group equivalent) of the fatty amine described under (A), are stirred for one hour at 100° C. A highly viscous product with an epoxide group equivalent weight of 685 is obtained.

(H) 91.2 g. of butanediol diglycidyl ether (0.8 epoxide group equivalent), together with 62 g. (0.2 amino group equivalent) of a mixture of 1 - amino - eicosane and 1-amino-docosane, are stirred for one hour at 100° C. A clear, viscous product with an epoxide group equivalent weight of 257 is obtained.

(I) 99 g. of hexahydrophthalic acid diglycidyl ester (0.6 epoxide group equivalent), together with 46.5 g. (0.15 amino group equivalent) of a mixture of 1-amino-eicosane and 1-amino-docosane are stirred for one hour at 100° C. A clear, viscous product with an epoxide equivalent weight of 395 is obtained.

(J) 98 g. of an epoxide formed from 2,2-bis-(4'-hydroxyphenyl)-propane and epichlorohydrin (0.5 epoxide group equivalent), together with 33.7 g. of stearylamine (0.125 amino group equivalent), are stirred for 1 hour at 100° C. A clear, viscous product with an epoxide group equivalent of 400 is obtained.

(K) 96 g. of an epoxide of the formula (4)
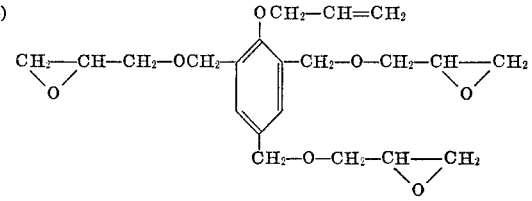

(0.6 epoxide group equivalent), together with 46.5 g. (0.15 amino group equivalent) of a mixture of 1-amino-eicosane and 1-amino-docosane, are stirred for 1 hour at 100° C. A clear, viscous product with an epoxide group equivalent weight of 278 is obtained.

(L) 99.6 g. of triglycidyl isocyanurate (0.6 epoxide group equivalent), together with 46.5 g. (0.15 amino group equivalent) of a mixture of 1-amino-eicosane and 1-amino-docosane, are stirred for 1 hour at 100° C. A clear product with an epoxide group equivalent weight of 208 is obtained.

(M) 156.8 g. of an epoxide formed from 2,2-bis-(4'-hydroxyphenyl)-propane and epichlorohydrin (0.8 epoxide group equivalent), together with 37.1 g. of laurylamine (0.2 amino group equivalent), are stirred for 1 hour at 100° C. A clear product with an epoxide group equivalent weight of 403 is obtained.

(N) 98 g. of an epoxide formed from 2,2-bis-(4'-hydroxyphenyl)-propane and epichlorohydrin (0.5 epoxide group equivalent) are warmed to 85 to 90° C. internal temperature. 124 g. (0.4 amino group equivalent) of a mixture of 1-amino-eicosane and 1-amino-docosane is then added over the course of 15 minutes. Thereafter the mixture is stirred for a further 6 hours at 100° C. internal temperature. A highly viscous product with an epoxide group equivalent weight of 2220 is obtained.

(O) 196 g. of an epoxide formed from 2,2-bis-(4'-hydroxyphenyl)-propane and epichlorohydrin (1 epoxide group equivalent), together with 32 g. of lauryl-propylenediamine (0.2 amine equivalent), are stirred for 1 hour at 100° C. A clear product with an epoxide group equivalent weight of 380 is obtained.

(P) 196 g. of an epoxide formed from 2,2-bis-(4'-hydroxyphenyl)-propane and epichlorohydrin (1 epoxide group equivalent), together with 20.4 g. of tall oil propylenediamine (0.1 amine equivalent), are stirred for 1 hour at 100° C. A clear product with an epoxide group equivalent weight of 282 is obtained.

Example 1

49.4 g. of a polyamide of polymerised linoleic acid and diethylenetriamine (0.2 amino group equivalent) are dissolved in 50 g. of butylglycol and warmed to 53° C. internal temperature. A solution of 18.95 g. of epoxide (C) (0.05 epoxide group equivalent) in 20 g. of n-butylglycol is then run in dropwise over the course of 30 minutes. One hour thereafter, a solution of 8 g. of glacial actic acid in 195 g. of deionised water is added and the mixture is further stirred until cold. A mobile solution of solids content 20% and pH value 7.0 is obtained.

Example 2

49.4 g. (0.2 amino group equivalent) of the polymer from Example 1 are dissolved in 50 g. of n-butylglycol and warmed to 58° C. internal temperature. A solution of 34.25 g. of epoxide (G) (0.05 epoxide group equivalent) and 35 g. of n-butylglycol is then run in dropwise over the course of 40 minutes. One hour thereafter, a solution of 7 g. of glacial acetic acid in 226 g. of deionised water is added and the mixture is stirred until cold. A viscous solution of solids content 20% and pH value 7.0 is obtained.

Example 3

61.8 g. of a polyamide of polymerised linoleic acid and diethylenetriamine (0.25 amino group equivalent) are dissolved in 61.8 g. of isopropanol and warmed to 53° C. internal temperature. A solution of 12.85 g. of epoxide (H) (0.05 epoxide group equivalent) in 12.85 g. of isopropanol is then added dropwise over the course of 30 minutes. One hour thereafter, a solution of 15 g. of galicial acetic acid in 200 g. of deionised water is added and the mixture is further stirred until cold. A mobile solution of solids content 20% and pH value 6.0 is obtained.

Example 4

49.4 g. (0.2 amino group equivalent) of the polyamide according to Example 3 are dissolved in 49.4 g. of ethanol and warmed to 53° C. internal temperature. A solution of 19.8 g. of epoxide (I) (0.05 epoxide group equivalent) in 19.8 g. of ethanol is then added dropwise over the course of 30 minutes. One hour thereafter, 24 g. of glacial acetic acid in 180 g. of deionised water are added and the mixture is further stirred until cold. A clear, mobile solution of solids content 20% and pH value 5.9 is obtained.

Example 5

49.4 g. (0.2 amino group equivalent) of the polyamide according to Example 3 are dissolved in 49.4 g. of butylglycol and warmed to 54° C. internal temperature. A solution of 20 g. of epoxide (J) (0.05 epoxide group equivalent) in 20 g. of butylglycol is then added dropwise over the course of 30 minutes. One hour thereafter, 12 g. of glacial acetic acid in 190 g. of deionised water are added and the mixture is further stirred until cold. A clear, mobile solution of solids content 20% and pH value 5.4 is obtained.

Example 6

49.4 g. (0.2 amino group equivalent) of the polyamide according to Example 3 are dissolved in 49.4 g. of dioxane and warmed to 55° C. internal temperature. A solution of 13.9 g. of epoxide (K) (0.05 epoxide group equivalent) in 13.9 g. of dioxane is then run in dropwise over the course of 30 minutes.

One hour thereafter, 12 g. of glacial acetic acid in 172 g. of deionised water are added and the mixture is further stirred until cold. A mobile solution of solids content 20% and pH value 5.4 is obtained.

Example 7

79 g. (0.32 amino group equivalent) of the polyamide according to Example 3 are dissolved in 79 g. of butylglycol and warmed to 55° C. internal temperature. A solution of 16.6 g. of epoxide (L) (0.08 epoxide group equivalent) and 16.6 g. of butylglycol is then run in dropwise over the course of 30 minutes. 40 minutes thereafter, 19.2 g. of glacial acetic acid and 260 g. of deionised water are added and the mixture is further stirred until cold. A mobile solution of solids content 20% and pH value 5.6 is obtained.

Example 8

(a) 187 g. of polymerised fatty acid and 68.5 g. of diethylenetriamine are introduced into a reaction vessel which is provided with a stirrer, thermometer, nitrogen inlet tube and distillation head. The polymerised fatty acid, obtained by polymerisation of oleic acid, has the following properties: 95% dimerised oleic acid; equivalent weight: 289.

The reaction mixture is heated to 200° C. over the course of 1½ hours under a nitrogen atmosphere and whilst stirring, and in doing so the splitting off of water starts at 160° C. internal temperature. After a further 2 hours at 200° C., a total of 13 parts of water are collected. Thereafter the mixture is concentrated for 3 hours in vacuo (14 mm. Hg) at 200 to 210° C. 210 g. of a viscous, yellowish, clear product with an amine equivalent weight of 372 are obtained.

(b) 74.4 g. of the condensation product described under (a) (0.2 amino group equivalent) are dissolved in 74.4 g. of butylglycol and warmed to 55° C. internal temperature. A solution of 20.2 g. of epoxide (M) (0.05 epoxide group equivalent) and 20.2 g. of butylglycol is then run in dropwise over the course of 30 minutes. 30 minutes thereafter, 12 g. of glacial acetic acid and 265 g. of deionised water are added and the mixture is further stirred until cold. A clear, mobile solution of solids content 20% and pH value 6.0 is obtained.

Example 9

44.6 g. of the condensation product described under (8a) (0.12 amino group equivalent) are dissolved in 44.6 g. of butylglycol and warmed to 60° C. internal temperature. 7.2 g. of glacial acetic acid and a solution of 44.4 g. of epoxide N (0.02 epoxide group equivalent) and 44.4 g. of butylglycol are then run in dropwise over the course of 30 minutes from 2 separate dropping funnels. Thereafter the mixture is stirred for a further 6½ hours at 60° C. internal temperature, and a further 10 g. of glacial acetic acid are then added. After a further 30 minutes, the mixture is diluted with 180 g. of butylglycol. A clear, mobile solution of solids content 20% is obtained.

A sample diluted with water, 1:20, shows a pH value of 5.8.

Example 10

66.6 g. of epoxide N (0.03 epoxide group equivalent) are dissolved in 66.6 g. of butylglycol and warmed to 60° C. internal temperature. 5.6 g. of glacial acetic acid and a solution of 33.4 g. of the condensation product described under (8a) (0.09 amino group equivalent) and 33.4 g. of butylglycol are then run in dropwise over the course of 30 minutes from 2 separate dropping funnels. Thereafter the mixture is stirred for a further 6½ hours at 60° C. internal temperature, and a further 10 g. of glacial acetic acid are then added. After a further 30 minutes, the mixture is diluted with 283 g. of butylglycol. A clear, mobile solution of solids content 20% is obtained. A sample diluted with water, 1:20, shows a pH value of 5.8.

Example 11

68.5 g. of epoxide (G) (0.1 epoxide group equivalent) are dissolved in 37 g. of isopropanol and warmed to 88° C. internal temperature. A solution of 24.7 g. (0.1 amino group equivalent) of the polyamide according to Example 3 and 15 g. of isopropanol is then run in dropwise over the course of 30 minutes.

Thereafter the mixture is stirred for a further 5 hours at approx. 88° C. internal temperature (reflux), and 1.85 g. of epichlorohydrin (0.02 mol) are then added. After a further 10 minutes, a solution of 16 g. of glacial acetic acid and 312 g. of deionised water is added and the mixture is further stirred until cold. A mobile product of solids content 20% and pH value 4.6 is obtained.

Example 12

79 g. (0.32 amino group equivalent) of the polyamide according to Example 3 are dissolved in 40 g. of butylglycol and warmed to 80° C. internal temperature. A solution of 30.4 g. of epoxide (O) (0.08 epoxide group equivalent) and 30.4 g. of butyl glycol is then run in dropwise over the course of 30 minutes.

15 minutes thereafter, 20 g. of glacial acetic acid and 336 g. of deionised water are added and the mixture is further stirred until cold. A mobile solution of solids content 20% and pH value 5.3 is obtained.

Example 13

79 g. (0.32 amino group equivalent) of the polyamide according to Example 3 are dissolved in 40 g. of butylglycol and warmed to 80° C. internal temperature. A solution of 22.6 g. of epoxide (P) and 22.6 g. of butylglycol is then run in dropwise over the course of 30 minutes.

15 minutes thereafter, 20 g. of glacial acetic acid and 311 g. of deionised water are added and the mixture is further stirred until cold. A mobile solution of solids content 20% and pH value 5.2 is obtained.

Example 14

79 g. (0.32 amino group equivalent) of the polyamide according to Example 3 are warmed to 180° C. internal temperature. 16.7 g. of dodecene oxide (0.08 mol) are run in dropwise over the course of 2 hours, the mixture is kept at 180° C. for a further 2 hours and then cooled to 50° C. internal temperature, and the product is dissolved in 32 g. of butylglycol. A solution of 20.4 g. of epoxide (A) (0.08 epoxide group equivalent) and 20.4 g. of butylglycol is then run in dropwise over the course of 30 minutes at 50° C. internal temperature. Thereafter the internal temperature is raised to 60° C. and the mixture is stirred for a further 1¼ hours at this temperature. 20 g. of glacial acetic acid and 391 g. of deionised water are then added and the mixture is further stirred until cold. A mobile solution of solids content 20% and a pH value of 4.9 is obtained.

Example 15

79 g. (0.32 amino group equivalent) of the polyamide according to Example 3, together with 10.1 g. of benzyl chloride (0.08 mol), are stirred for 2 hours at 100° C. internal temperature. The product is then cooled to 60° C. internal temperature and 32 g. of butylglycol are added. A solution of 20.4 g. of epoxide (A) (0.08 epoxide group equivalent) and 20.4 g. of butylglycol is then run in dropwise at this temperature over the course of 30 minutes. 25 minutes thereafter, 20 g. of glacial acetic acid and 364 g. of deionised water are added and the mixture is further stirred until cold. A mobile solution of solids content 20% and pH value 4.6 is obtained.

Example 16

79 g. (0.32 amino group equivalent) of the polyamide according to Example 3 are dissolved in 32 g. of butylglycol and warmed to 50° C. internal temperature. 4.3 g. of acrylonitrile (0.08 mol) are then added and the mixture is stirred for 2 hours at 50° C. internal temperature. A solution of 20.4 g. of epoxide A (0.08 epoxide group equivalent) and 20.4 g. of butylglycol is then run in dropwise over the course of 30 minutes. 1½ hours thereafter, 20 g. of glacial acetic acid and 339 g. of deionised water are added and the mixture is further stirred until cold. A mobile solution of solids content 20% and pH value 5.0 is obtained.

USE EXAMPLES

Example 17

100 kg. of wool yarn are dyed in the customary manner with reactive dyestuffs in 1000 litres of water in a cheese-dyeing apparatus. After dyeing, the yarn is throughly rinsed.

A fresh bath at 40° C., consisting of 1000 litres of water and 1.4 kg. of ammonia (25% strength) is prepared. Thereafter, 8 kg. of the product according to Example 1 are added. A stable emulsion forms, which is uniformly absorbed on the wool in about 30 minutes. Trisodium phosphate is then added, the process is allowed to continue for 10 minutes, and 2 kg. of a 12.5% strength solution of a condensation product of 1 mol of octadecyl alcohol and 25 mols of ethylene oxide are further added. After a further 20 minutes the yarn is thoroughly rinsed with cold water, drained and dried. The yarn treated in this way is nonfelting according to IWS specifications 7B, 7C and 71.

Instead of a product according to Example 1, a product of one of the Examples 2 to 16 can be used with equally good results.

Example 18

A woven fabric of pure wool is impregnated with the following preparation, and expressed to a liquor uptake of 100% on a horizontal two-roll padder:

120 g./l. of the product according to Example 1
2 g./l. of a condensation product of 1 mol of p-tert.-octylphenol and 8 mols of ethylene oxide
30 ml./l. of 33% strength hydrogen peroxide
848 ml./l. of water 1000 g. of padding liquor After padding, the goods are dried on a stenter frame. Thereafter they are also pressed for 5 minutes at 120° C. under medium press pressure (on a "Hoffmann press").

The goods thus treated show the following shrinkage values on testing according to IWS Specification 71:

| | Percent shrinkage |
|---|---|
| Untreated goods | 53 |
| Treated goods | 2.1 |

If, before the treatment just described, the fabric is additionally subjected to the known reductive treatment with monoethanolamine sulphite, the goods are additionally surface-stable, that is to say they remain smooth and free from creases even after washing.

Example 19

3.0 g. of a preparation according to Example 1 are worked into a paste with 10.0 g. of a surface-active agent of the composition given below, and this mixture is diluted to 1000 ml. with perchloroethylene. Brief stirring yields a stable dispersion. 20 g. of a knitted woollen piece are treated with this liquor for 50 minutes at 20° C. After removing excess liquor by centrifuging off, the piece is dried, and fixed, for 10 minutes at 100° C. The treated knitted piece is in each case non-felting.

The following products are used as surface-active agents:

(I) Condensation product of 1 mol of coconut fatty acid and 2 mols of diethanolamine, containing about 2% of water and about 2% of acetic acid.

(II) Acid phosphoric acid ester of a condensation product of 1 mol of 2-ethylhexanol and 5 mols of ethylene oxide, neutralised with sodium hydroxide, in the form of an 80% strength aqueous solution.

(III) Aqueous solution containing: 38.5% of an oleic acid of a polyglycol ester, 38.5% of a condensation product of 1 mol of p-tert.-octylphenol and 8 mols of ethylene oxide, and 15.5% of oleic acid.

Example 20

100 kg. of bleached sulphite cellulose are ground in the usual manner in a hollander and subsequently discharged into a mixing vessel. 20 kg. of calcium carbonate are added as a filler in the mixing vessel. When the filler has become well distributed in the pulp suspension, 0.3 to 0.7% of the product according to Example 11, relative to cellulose and solids content, is added. The pulp mixture passes through the paper machine via further stages of the process of paper manufacture.

To increase the filler retention, a retention agent can be added shortly before running the pulp onto the machine.

Papers manufactured with this or a similar pulp composition are predominantly used as writing papers and printing papers and show excellent ink resistance, resulting from the good sizing.

Aluminium sulphate, which is introduced into this system in smaller or greater amounts through the conjoint use of waste paper, in no way interferes with the sizing.

In this system, the calcium carbonate can also be replaced by commercially available kaolin. The sizing effect is the same as when using calcium carbonate.

We claim:

1. Process for the manufacture of stable preparations of water-soluble or water-dispersible reaction products of epoxides, fatty amines and basic polyamides, characterised in that (a) a reaction product of (a') an epoxide which contains at least two epoxide groups per molecule, and (a'') a fatty amine of the formula $$H_3C—(CH_2)_x—NH_2$$

wherein $x$ is an integer of from 11–23, the equivalent ratio of epoxide groups to amine groups being 1:0.1 to 1:0.85, is reacted (b) with a basic polyamide which is obtained by condensation of (b') a polymeric, unsaturated fatty acid and (b'') a polyalkylenepolyamine, in the presence of an organic solvent, at temperatures of up to 95° C., with the equivalent ratio of epoxide groups of the component (a) to amino groups of the component (b) being 1:1 to 1:6, and that provision is made, by addition of acid not later than on completion of the reaction, that a sample of the reaction mixture has a pH value of 2 to 8 after addition of water.

2. Process according to claim 1, characterised in that the equivalent ratio of epoxide groups of the component (a') to amino groups of the component (a'') is 1:0.1 to 1:0.5, the equivalent ratio of epoxide groups of the component (a) to amino groups of the component (b) is 1:1 to 1:5, and the reaction of the components (a) and (b) takes place at temperatures of up to 80° C.

3. Process according to claim 1, characterised in that an epoxide which is derived from a bisphenol is used as component (a').

4. Process according to claim 1, characterised in that a polyglycidyl ether of 2,2-bis-(4'-hydroxyphenyl)-propane is used as component (a').

5. Process according to claim 1, characterised in that the component (a') has an epoxide content of at least 5 epoxide group equivalents per kg.

6. Process according to claim 1, characterised in that a reaction product of epichlorohydrin wtih 2,2-bis-(4'-hydroxyphenyl)-propane is used as the component (a').

7. Process according to claim 1, characterised in that a mono-fatty amine with 12 to 24 carbon atoms is used as the component (a'').

8. Process according to claim 1, characterised in that in the formula of the component (a''), $x$ denotes an integer having a value of 17 to 21.

9. Process according to claim 1, characterised in that an aliphatic, ethylenically unsaturated dimeric to trimeric fatty acid is used as the component (b').

10. Process according to claim 1, characterised in that a fatty acid which is derived from an aliphatic unsaturated monocarboxylic acid with 16 to 22 carbon atoms is used as the component (b').

11. Process according to claim 1, characterised in that dimerised to trimerised linoleic acid or linolenic acid is used as the component (b').

12. Process according to claim 1, characterised in that an aliphatic polyamine of the formula $$H_2N—(CH_2—CH_2—NH)_n—CH_2—CH_2—NH_2$$

wherein $n$ is 1, 2 or 3, is used as the component (b'').

13. Process according to claim 1, characterised in that a basic polyamide of dimerised to trimerised linoleic or linolenic acid and a polyamine of the formula $$H_2N—(CH_2—CH_2—NH)_n—CH_2—CH_2—NH_2$$

wherein $n$ is 1, 2 or 3, is used as the component (b).

14. Process according to claim 1, characterised in that diethylenetriamine, triethylenetetramine or tetraethylenepentamine are used as the component (b'').

15. Process according to claim 1, characterised in that the reaction is carried out at 25 to 95° C.

16. Process according to claim 1, characterised in that the reaction product of the components (a) and (b) is obtained with the conjoint use of (c) a monofunctional or difunctional compound which differs from (a) and (b).

17. Process according to claim 16, characterised in that the component (c) is an epihalogenohydrin.

References Cited

UNITED STATES PATENTS 3,647,728   3/1972   Deflorin et al. _____ 260—18

DONALD E. CZAJA, Primary Examiner

E. C. RZUCIDLO, Assistant Examiner

U.S. Cl. X.R.

117—139.5; 260—29.2 EP, 29.2 N, 32.6 R, 47 EN, 830 P